(12) United States Patent
Webster et al.

(10) Patent No.: US 7,216,399 B2
(45) Date of Patent: May 15, 2007

(54) CASTER BRAKE

(75) Inventors: Deryl Thomas Webster, Angola, IN (US); Robert Andrew Link, Hamilton, IN (US)

(73) Assignee: Vestil Manufacturing Company, Angola (IN)

( * ) Notice: Subject to any disclaimer, the term of this patent is extended or adjusted under 35 U.S.C. 154(b) by 0 days.

(21) Appl. No.: 10/961,321

(22) Filed: Oct. 8, 2004

(65) Prior Publication Data

US 2006/0082088 A1    Apr. 20, 2006

(51) Int. Cl.
*B60B 15/00* (2006.01)
(52) U.S. Cl. .......................... 16/32; 280/79.11; 410/66
(58) Field of Classification Search ................. 410/66; 16/34, 32, 33; 280/79.11, 47.34, 47.35
See application file for complete search history.

(56) References Cited

U.S. PATENT DOCUMENTS

| | | | | |
|---|---|---|---|---|
| 1,931,446 A | * | 10/1933 | Muller | 16/34 |
| 1,999,106 A | * | 4/1935 | Muller | 16/34 |
| 2,360,874 A | * | 10/1944 | Herold | 188/5 |
| 2,712,366 A | * | 7/1955 | Skupas | 188/5 |
| 2,828,578 A | * | 4/1958 | McCabe | 248/188.4 |
| 2,885,181 A | * | 5/1959 | McCully et al. | 254/420 |
| 2,945,242 A | * | 7/1960 | Heiden et al. | 5/86.1 |
| 2,964,327 A | * | 12/1960 | Mohr | 280/43.24 |
| 3,878,573 A | * | 4/1975 | Boudewyn | 5/658 |
| 4,035,864 A | | 7/1977 | Schroder | |
| 5,035,445 A | * | 7/1991 | Poulin | 280/763.1 |
| 5,323,879 A | | 6/1994 | Poulin | |
| 5,347,682 A | * | 9/1994 | Edgerton, Jr. | 16/34 |
| 5,366,231 A | | 11/1994 | Hung | |
| 5,431,254 A | * | 7/1995 | Kramer et al. | 188/7 |
| 5,996,163 A | * | 12/1999 | Galizia | 15/160 |
| 6,119,989 A | * | 9/2000 | Hollington et al. | 248/188.2 |
| 6,286,183 B1 | | 9/2001 | Stickel et al. | |
| 6,349,907 B1 | * | 2/2002 | Hollington et al. | 248/188.4 |
| 6,473,921 B2 | * | 11/2002 | Brooke et al. | 5/600 |
| 6,591,449 B1 | * | 7/2003 | Parkin | 16/35 R |
| 6,611,973 B2 | * | 9/2003 | Connell | 5/9.1 |
| 6,698,060 B1 | | 3/2004 | Lee | |
| 6,725,501 B2 | | 4/2004 | Harris et al. | |
| 6,843,625 B2 | * | 1/2005 | Hewitt | 410/66 |
| 2004/0069568 A1 | | 4/2004 | Wyse et al. | |

* cited by examiner

*Primary Examiner*—J. Allen Shriver
(74) *Attorney, Agent, or Firm*—Baker & Daniels LLP

(57) ABSTRACT

A brake is disclosed for use with a cart. The brake includes a pad that contacts the floor to resist movement of the cart. The height of the pad is adjustable.

24 Claims, 4 Drawing Sheets

CASTER BRAKE

BACKGROUND AND SUMMARY OF THE INVENTION

The present invention relates devices having wheels. More particularly, the present invention relates to devices for braking a device having wheels.

According to one aspect of the present invention, a brake is provided for use with a cart having a frame and a plurality of wheels supporting the frame on a floor. The brake includes a base configured to couple to a frame of a cart, a pedal supported by the base, and a pad operably connected to the pedal. The pad is moveable by the pedal between a first position spaced apart from the floor and a second position in contact with the floor to inhibit movement of the cart relative to the floor. The pad is spaced apart from the base by a first distance when in the first position. The first distance is adjustable.

According to another aspect of the present invention, another brake is provided for use with a cart configured to transport items from one location to another over a floor. The cart includes a frame and a plurality of wheels supporting the frame on the floor. The brake includes a base configured to be coupled to the frame, a pedal supported by the base, and a pad operably connected to the pedal. The pad is moveable by the pedal between a first position spaced apart from the floor and a second position in contact with the floor to inhibit movement of the cart relative to the floor. The pad includes a plurality of suction cups in contact with the floor when the pad is in the second position.

According to another aspect of the present invention, a method of adjusting a brake of a cart is provided. The method includes the step of providing a cart including a frame, a plurality of wheels supporting the frame, and a brake. The brake includes a base and a pad moveable between a first position spaced apart from the floor and a second position in contact with the floor. The pad is spaced apart from the base by a first distance when in the first position. The method further includes the step of adjusting the first distance to compensate for wear of at least one of the wheels.

Additional features of the disclosure will become apparent to those skilled in the art upon consideration of the following detailed description when taken in conjunction with the accompanying drawings.

BRIEF DESCRIPTION OF THE DRAWINGS

A detailed description particularly refers to the accompanying figures in which.

DETAILED DESCRIPTION OF THE DRAWINGS

Figure 1:
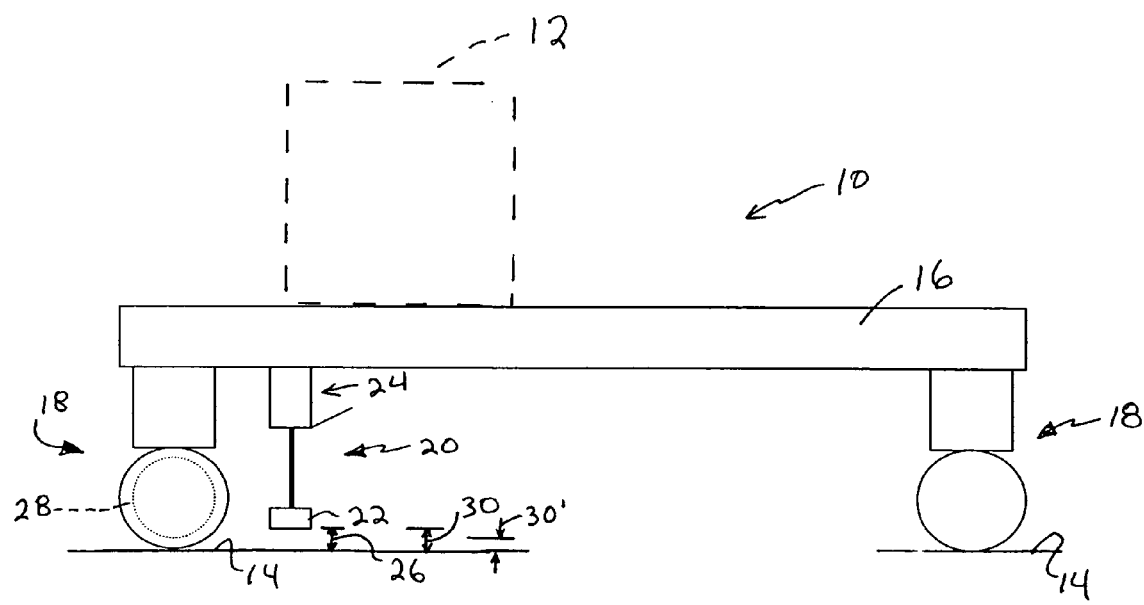
FIG. 1 is a diagrammatic view of a cart showing a plurality of casters supporting a frame and a brake positioned to inhibit movement of the cart.

Referring to FIG. 1, a cart 10 is shown for transporting one or more objects 12 over a floor 14. Cart 10 includes a frame 16, a plurality of wheels 18, and one or more brakes 20. Wheels 18 are preferably caster-type wheels that rotate to permit cart 10 to roll over floor 14 and swivel about a substantially vertical axis to ease turning and changes of direction of cart 10. Additional details of suitable caster-type wheels are provided in U.S. Pat. No. 6,725,501 to Harris et al.; U.S. Pat. No. 6,698,060 to Lee; U.S. Pat. No. 6,286,183 to Stickel et al; and U.S. Pat. No. 4,035,864 to Schröder, the disclosures of which are incorporated by reference herein.

Brake 20 includes a brake pad 22 and a pad actuator 24 that raises and lowers pad 22 relative to floor 14. When a user wants to move cart 10 from one location to another, the user raises pad 22 with actuator 24. When a user wants to inhibit cart 10 from moving, the user lowers pad 22 with actuator 24 by a distance 26 so that pad 22 contacts floor 14 and resists movement of cart 10 relative to floor 14. Typically, actuator 24 moves to a locked position holding pad 22 in contact with floor 14. To move cart 10, the user moves actuator 24 to an unlocked position to raise pad 22 to the raised position away from floor 14.

When brake 20 is initially mounted on cart 10, a user applies a preferable amount of force to actuator 24 to move actuator 24 to the locked position after pad 22 contacts floor 14. As wheels 18 wear down, more force is required to move actuator 24 to the locked position after pad 22 contacts floor 14. When wheels 18 wear down, they have a smaller outside radius as indicated by outside wheel diameter 28 (in phantom) shown in FIG. 1. Because the radius of wheels 18 is reduced, frame 16 of cart 10 sits closer to floor 14 and pad 22 has less distance to travel before contacting floor 14. Because of the decreased distance, more force is required to move actuator 24 to the locked position. Eventually, the amount of force necessary to move actuator 24 to the locked position exceeds a preferred amount.

To compensate for the decreased radius of wheels 18, the position of pad 22 relative to frame 16 can be adjusted. For example, as frame 16 lowers because of the wear of wheels 18, pad 22 can be raised. When cart 10 is initially constructed and before wheels 18 have worn down, pad 22 is preferably at a height 30 above floor 14. After wheels 18 have worn down and before any adjustment, pad 22 is at a height 30' because frame 16 is closer to floor 14. When the position of pad 22 is adjusted to compensate for the wear, pad 22 is again preferably at height 30. Typically, the difference between height 30 and height 30' is equal to the difference of the radius of wheels 18 before and after wheels 18 wear down. If necessary, the height of pad 22 can be adjusted multiple times over the life of cart 10. Additionally, if wheels 18 are replaced, pads 22 can be adjusted up or down to match the replacement wheels.

Because the position of pads 22 is adjustable, brakes 20 may be used on different cart configurations having different mounting heights for brakes 20. Depending on the specific design of cart 10, the height of pads 22 may need adjusted. For example, if cart 10 includes a frame 16 that sits higher off of floor 14, pads 22 are lowered relative to frame 16 so that pads 22 reach floor 14 and a preferred amount of force is necessary to move actuator 24 to the locked position. If cart 10 includes a frame 16 that sits lower off of floor 14, pads 22 are raised relative to frame 16. Pads 22 may also later be adjusted to compensate for wheels 18 wearing down as described above. It should be further understood that the adjustability of pads 22 permits brake 20 to be used on carts 10 having wheels 18 of various initial wheel diameters or wheels 18 with rigs (i.e., structures for mounting the wheels 18 to cart 10) of various heights. Accordingly, in addition to compensating for wheel wear as described above, brake 20 may be adjusted for use with wheels 18 provided by various different manufacturers that, because of the diameters of the wheels or the configuration of the rigs, space frame 16 various initial distances from floor 14.

Figure 2:
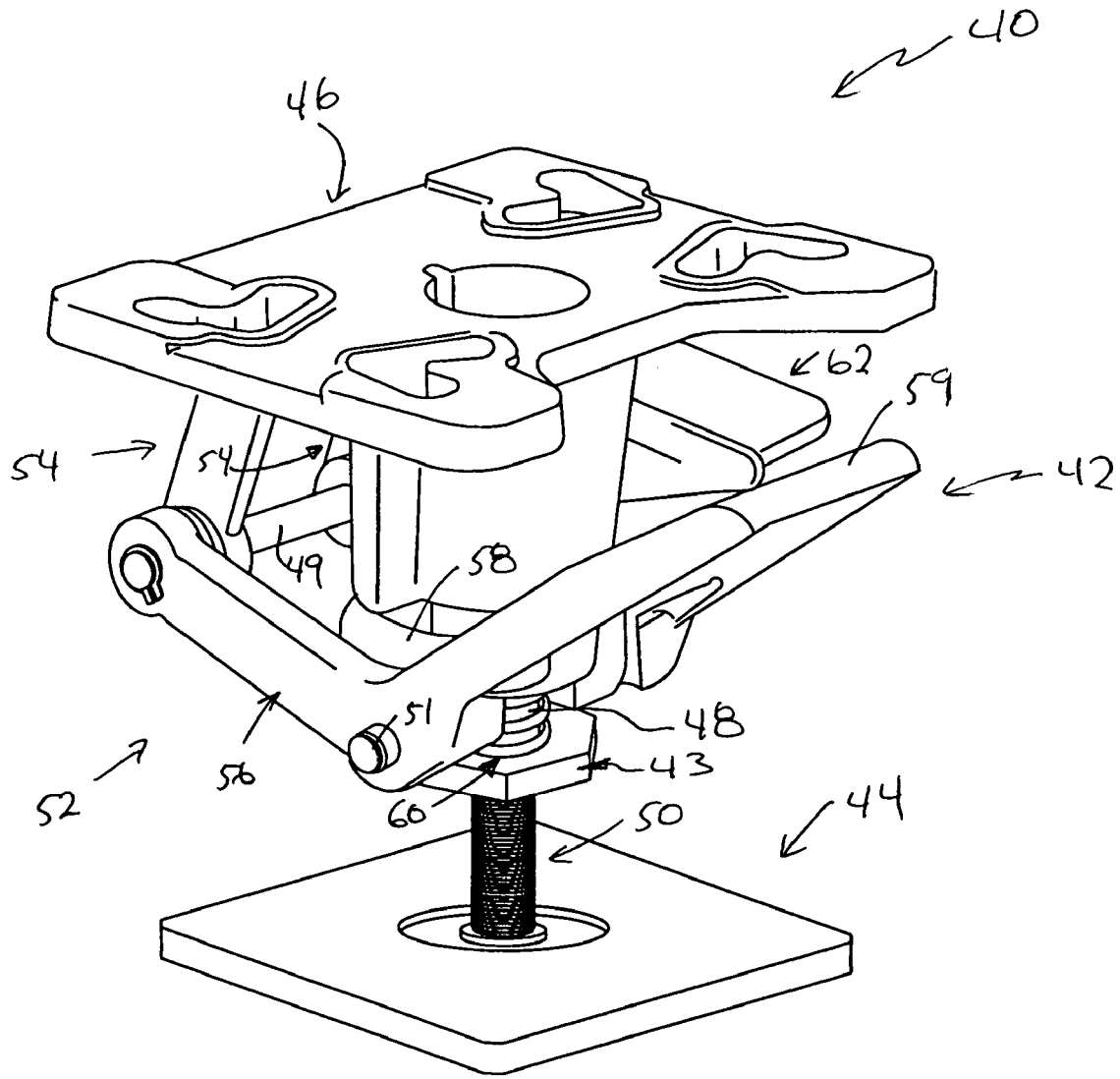
FIG. 2 is a perspective view of a brake showing the brake in a raised position allowing the cart to roll on a floor.
Figure 3:
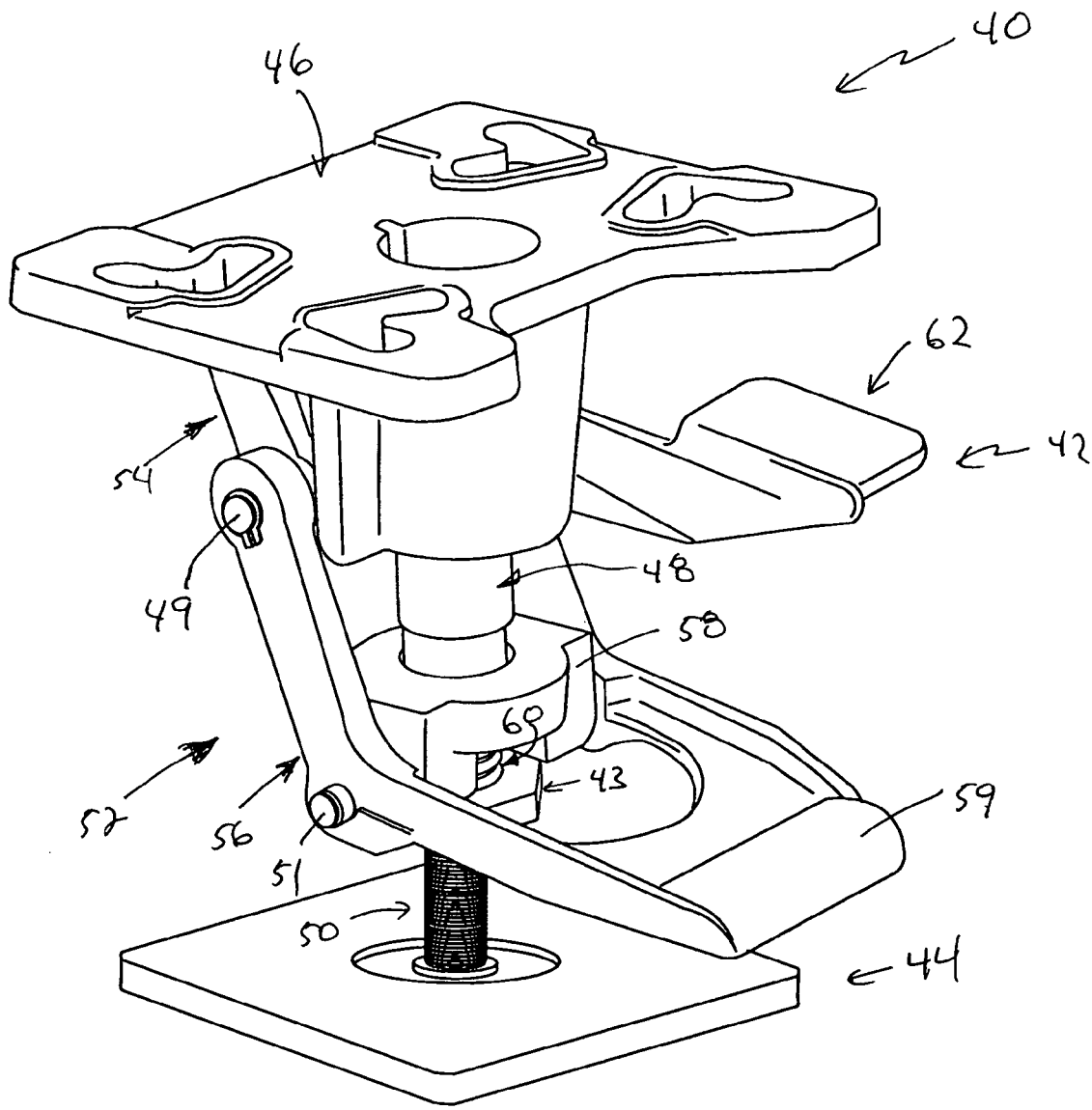
FIG. 3 is a view similar to FIG. 2 showing the brake in a lowered position blocking movement of the cart.

One embodiment of a brake 40 is shown in FIGS. 2 and 3. Brake 40 includes an actuator 42 and a pad 44 coupled to actuator 42. Actuator 42 moves pad 44 up and down relative to the floor in a manner similar to actuator 24 described above. Actuator 42 includes a base 46 normally coupled to the cart frame by bolts (not shown) or other fasteners. Actuator 42 also includes a shaft 48 positioned at least partially within base 46 and a threaded member 50 coupled to shaft 48. Shaft 48 includes a head (not shown) positioned within base 46. A spring (not shown) is also positioned in base 46 under the head of shaft 48 and urges shaft 48 upward.

Pad 44 is coupled to a lower end of threaded member 50. According to one embodiment, pad 44 is rigidly coupled to threaded member 50. According to another embodiment, pad 44 is coupled to threaded member 50 through a universal joint, such as a ball joint, so that pad 44 can rotate and pivot relative to threaded member 50.

To adjust the position of pad 44, threaded member 50 (or pad 44) is rotated relative to shaft 48. Shaft 48 includes a collar 43 including female threads (not shown) that receive threaded member 50. Collar 43 preferably includes wrench flats to aid in adjusting the height of pad 44. During rotation of threaded member 50, pad 44 is raised or lowered relative to shaft 48 and base 46 depending on the direction of rotation of threaded member 50. A nut (not shown) may also be provided on threaded member 50 to prevent unwanted rotation of threaded member 50. This nut is backed away from collar 43 during adjustment of the position of pad 44 and tightened against collar 43 after the adjustment is made.

Actuator 42 also includes a linkage 52 that moves shaft 48, threaded member 50, and pad 44 up and down between a first raised position (shown in FIG. 2) with pad 44 spaced apart from the floor and a second lowered position (shown in FIG. 3) with pad 44 in contact with the floor. Linkage 52 is preferably an over-center linkage that locks into a position so that the force applied to pad 44 tends to maintain linkage 52 in the position shown in FIG. 3. Linkage 52 includes a first link 54 (or pair of links 54) pivotably coupled to base 46 by a pin (or pair of pins, not shown) and a second link 56 (or pair of links 56) pivotably coupled to first link 54 by a pin 49 and a collar 58 that fits over shaft 48. Second link 56 is pivotably coupled to collar 58 by two pins 51 located on each side of second link 56.

Second link 56 includes a pedal 59 which a user steps on to move pad 44 to the lowered position in contact with the floor. When a user steps on pedal 59 of second link 56, second link 56 pushes collar 58 down. Collar 58 urges threaded member 50, pad 44, and shaft 48 down so that pad 44 contacts the floor. The head of shaft 48 positioned in base 46 compresses the spring positioned in base under the head of shaft 48.

A spring 60 is provided between collar 58 and collar 43 of threaded member 50 to provide a tolerance factor for the travel distance of pad 44 during actuation of linkage 52. Typically, pad 44 initially contacts the floor before linkage 52 reaches the locked or over-center position shown in FIG. 3. During further movement of linkage 52 toward the locked position, pad 44 does not move relative to base 46 and collar 58 compresses spring 60 against collar 43 of threaded member 50 as shown in FIG. 3. During this compression of spring 60, collar 58 moves relative to threaded member 50 as linkage 52 moves to the locked position.

Brake 40 further includes a linkage release pedal 62 that is coupled to linkage 52 by pin 49. When a user steps on linkage release pedal 62, pin 49 and the remainder of linkage 52 are urged away from the locked or over-center position and pad 44 is raised.

During the initial movement of linkage 52 away from the locked position, collar 58 raises, but pad 44 remains in contact with the floor. As collar 58 moves up, the spring positioned in base 46 pushes up on and raises shaft 48, threaded member 50, and pad 44. Spring 60 also extends from the compressed state.

As the wheels of the cart wear down, the degree of the compression of spring 60 increases. Eventually, spring 60 may become fully compressed and brake 40 will lift the frame of the cart. At this time, the user may adjust the position of pad 44 relative to base 46 by rotating threaded member 50 relative to shaft 48 so that pad 44 is farther away from the floor when in the raised position. The height of pad 44 may also be adjusted at other times when desired.

Figure 4:
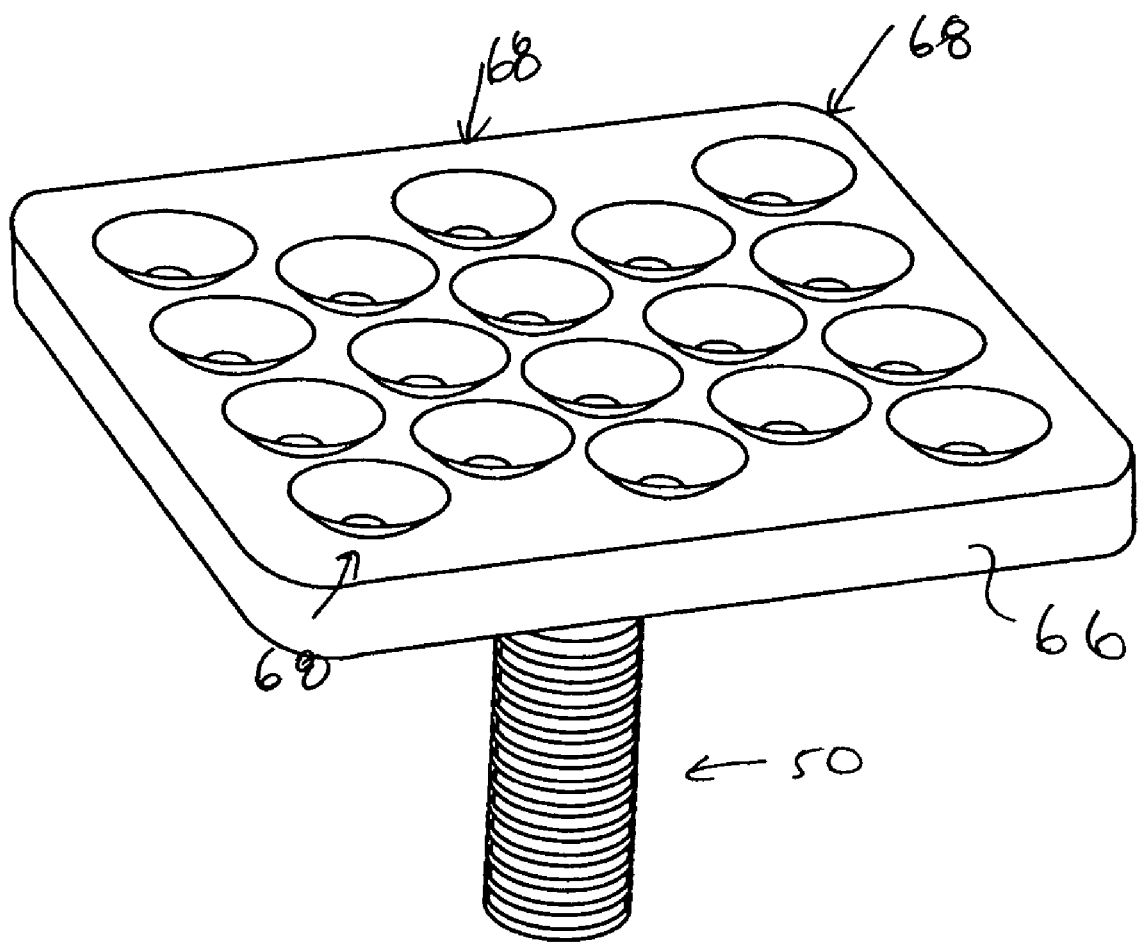
FIG. 4 is a perspective view showing an underside of a pad of the brake.

As shown in FIG. 4, pad 44 may include a rectangular body 66 and a plurality of suction cups or vacuum members 68 integral with body 66. Body 66 and suction cups 68 are preferably made of a rubber material. As pad 44 contacts the floor, suctions cups 68 are compressed against the floor. If the floor is sufficiently smooth, suction cups 68 seal with the floor and a vacuum is created between the floor and suction cups 68 that grips the floor. As shown in FIG. 4, suctions cups 68 are aligned in a plurality of rows that are either transverse or diagonal relative to the sides of body 66.

Although the present invention has been described in detail with reference to preferred embodiments, variations and modifications exist within the scope and spirit of the present invention as described and defined in the following claims.

The invention claimed is:

1. A brake for use with a cart having a frame and a plurality of wheels supporting the frame on a floor, the brake including
   a base configured to couple to a frame of a cart,
   a pedal supported by the base,
   a shaft extending into the base,
   a pad operably connected to the pedal, the pad being moveable by the pedal between a first position spaced apart from the floor and a second position in contact with the floor to inhibit movement of the cart relative to the floor, the pad being spaced apart from the base by a first distance when in the first position, and
   a threaded member connected to the shaft and pad, rotation of the threaded member adjusting the first distance.

2. The brake of claim 1, wherein the brake further includes an over-center linkage positioned to move the pad between the first and second positions.

3. The brake of claim 2, wherein the over-center linkage includes a first pedal configured to move the pad to the first position when stepped on by a user and a second pedal configured to move to the pad to the second position when stepped on by a user.

4. The brake of claim 3, wherein the first pedal is substantially centered relative to a central plane extending through the base and the second pedal is substantially offset relative to the central plane extending through the base.

5. The brake of claim 1, wherein the brake further includes a spring operably positioned between the base and the pad, the spring is compressed during movement of the pad between the first and second positions.

6. The brake of claim 5, wherein the brake further includes a linkage coupled to the base, a first spring seat coupled to the linkage, and a second spring seat connected to the pad, during movement of the pad between the first and second positions, the first and second spring seats compress the spring.

7. The brake of claim 5, wherein the shaft extends through the first spring seat and into the base, the threaded member is connected to the second spnng seat.

8. The brake of claim 7, wherein the linkage is an over-center linkage configured to move between a first position and a second over-center position, the brake further includes a linkage release pedal coupled to the linkage and positioned to move the linkage from the second over-center position to the first position.

9. The brake of claim 5, wherein the threaded member extends through the spring.

10. The brake of claim 1, wherein the pad includes a plurality of suction cups in contact with the floor when the pad is in the second position.

11. The brake of claim 10, wherein the plurality of suction cups cooperate to define rows.

12. The brake of claim 11, wherein the rows extend laterally across a bottom of the pad.

13. The brake of claim 11, wherein the rows extend diagonally across a bottom of the pad.

14. The brake of claim 13, wherein a portion of the rows extends laterally across the bottom of the pad.

15. The brake of claim 10, wherein the pad further includes a pad base and the plurality of suction cups are integral with the pad base.

16. The brake of claim 10, wherein the plurality of suction cups are compressed during movement of the pad from the first position to the second position.

17. A method of adjusting a brake of a cart including the steps of providing a cart including a frame, a plurality of wheels supporting the frame, and a brake, the brake including a base, a pad moveable between a first position spaced apart from the floor and a second position in contact with the floor, and an over-center linkage positioned to move the pad between the first and second positions, the pad being spaced apart from the base by a first distance when in the first position, and adjusting the first distance to compensate for variations in a distance between the frame and the floor.

18. The method of claim 17, wherein the pad rotates during the adjusting step.

19. The method of claim 17, wherein at least one of the plurality of wheels has a radius that changes by a first amount because of the wear and the pad is moved by about the first amount during the adjusting step.

20. The method of claim 19, wherein the pad is moved toward the base during the adjusting step.

21. The method of claim 17, wherein the brake includes a spring that is compressed during movement of the pad from the first position to the second position.

22. The method of claim 17, wherein the first distance decreases during the adjusting step.

23. The method of claim 17, wherein the over-center linkage includes a first pedal and a second pedal, further comprising the steps of stepping on the first pedal to move the pad to the first position and stepping on the second pedal to move the pad to the second position.

24. The method of claim 17, wherein the brake further comprises a first spring seat connected to the over-center linkage, a second spring seat connected to the pad, a spring positioned between the first and second spring seats, and a threaded member extending into the second spring seat.

* * * * *